United States Patent
Agarwal et al.

(10) Patent No.: US 10,656,972 B2
(45) Date of Patent: May 19, 2020

(54) MANAGING IDEMPOTENT OPERATIONS WHILE INTERACTING WITH A SYSTEM OF RECORD

(71) Applicant: International Business Machines Corporation, Armonk, NY (US)

(72) Inventors: Matu Agarwal, Bangalore (IN); Srinivasan Nanduri, Andhra Pradesh (IN); Siddalinga M. Swamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 15/348,278

(22) Filed: Nov. 10, 2016

(65) Prior Publication Data

US 2018/0131678 A1   May 10, 2018

(51) Int. Cl.
*G06F 9/54*   (2006.01)

(52) U.S. Cl.
CPC ..................... *G06F 9/54* (2013.01)

(58) Field of Classification Search
CPC ............. G06F 17/30; G06F 17/30498; G06F 17/30386
See application file for complete search history.

(56) References Cited

U.S. PATENT DOCUMENTS

| | | | |
|---|---|---|---|
| 8,161,236 B1 | 4/2012 | Noveck et al. | |
| 8,418,159 B2 | 4/2013 | Farchi et al. | |
| 8,751,639 B2 | 6/2014 | Griffiths | |
| 2007/0067266 A1* | 3/2007 | Lomet ................... | G06F 16/951 |
| 2014/0279987 A1* | 9/2014 | Chico de Guzman Huerta .......... | G06F 9/526 707/704 |
| 2015/0134795 A1* | 5/2015 | Theimer ................ | G06F 16/254 709/223 |
| 2015/0370560 A1* | 12/2015 | Tan ...................... | G06F 9/30058 717/148 |
| 2016/0246522 A1* | 8/2016 | Krishnamachari ..... | G06F 3/067 |
| 2017/0315740 A1* | 11/2017 | Corsi ................... | G06F 13/4282 |

OTHER PUBLICATIONS

Mell et al., "The NIST Definition of Cloud Computing," National Institute of Standards and Technology Special Publication 800-145, Sep. 2011, 7 pages.

* cited by examiner

*Primary Examiner* — Nelson S. Giddins
(74) *Attorney, Agent, or Firm* — Yee & Associates, P.C.

(57) ABSTRACT

Managing idempotent operations is provided. A request to perform an operation on a system of record is received from a client via a network. An idempotency resolver is queried to determine whether a result corresponding to the operation is located in a mapping table of the idempotency resolver. In response to determining that the result corresponding to the operation is in the mapping table of the idempotency resolver, the result corresponding to the operation that is located in the mapping table of the idempotency resolver is sent to the client via the network.

20 Claims, 10 Drawing Sheets

MANAGING IDEMPOTENT OPERATIONS WHILE INTERACTING WITH A SYSTEM OF RECORD

BACKGROUND

1. Field

The disclosure relates generally to idempotent operations and more specifically to managing idempotent operations by an idempotency resolver service using a mapping table while interacting with a system of record to increase response time and decrease recovery time.

2. Description of the Related Art

A system of record is an information storage and retrieval system that is an authoritative data source for a particular data element in an enterprise's data processing system. Information in a system of record is exchanged between the enterprise system and clients using a connector service, which is deployed in a cloud environment. A connector service makes services easier to use by hiding specifics of communications-related application programming interfaces. A connector service encapsulates generic communications-related logic required to use services, and also includes logic that is specific to a given service. Typically, a connect service is responsible for service connection management, request dispatch, response handling, and some error handling.

SUMMARY

According to one illustrative embodiment, a computer-implemented method for managing idempotent operations is provided. A computer receives a request to perform an operation on a system of record from a client via a network. The computer queries an idempotency resolver to determine whether a result corresponding to the operation is located in a mapping table of the idempotency resolver. In response to the computer determining that the result corresponding to the operation is in the mapping table of the idempotency resolver, the computer sends the result corresponding to the operation that is located in the mapping table of the idempotency resolver to the client via the network. According to other illustrative embodiments, a computer system and computer program product for managing idempotent operations are provided.

DETAILED DESCRIPTION

Figure 1:
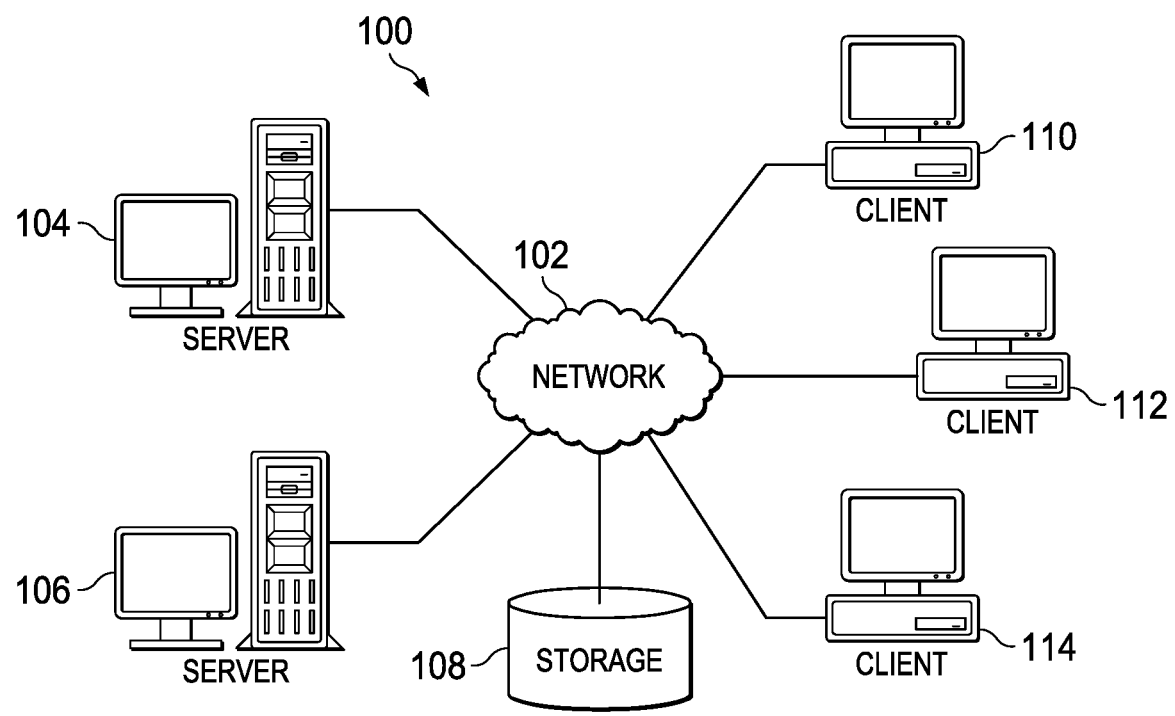
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include user names, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
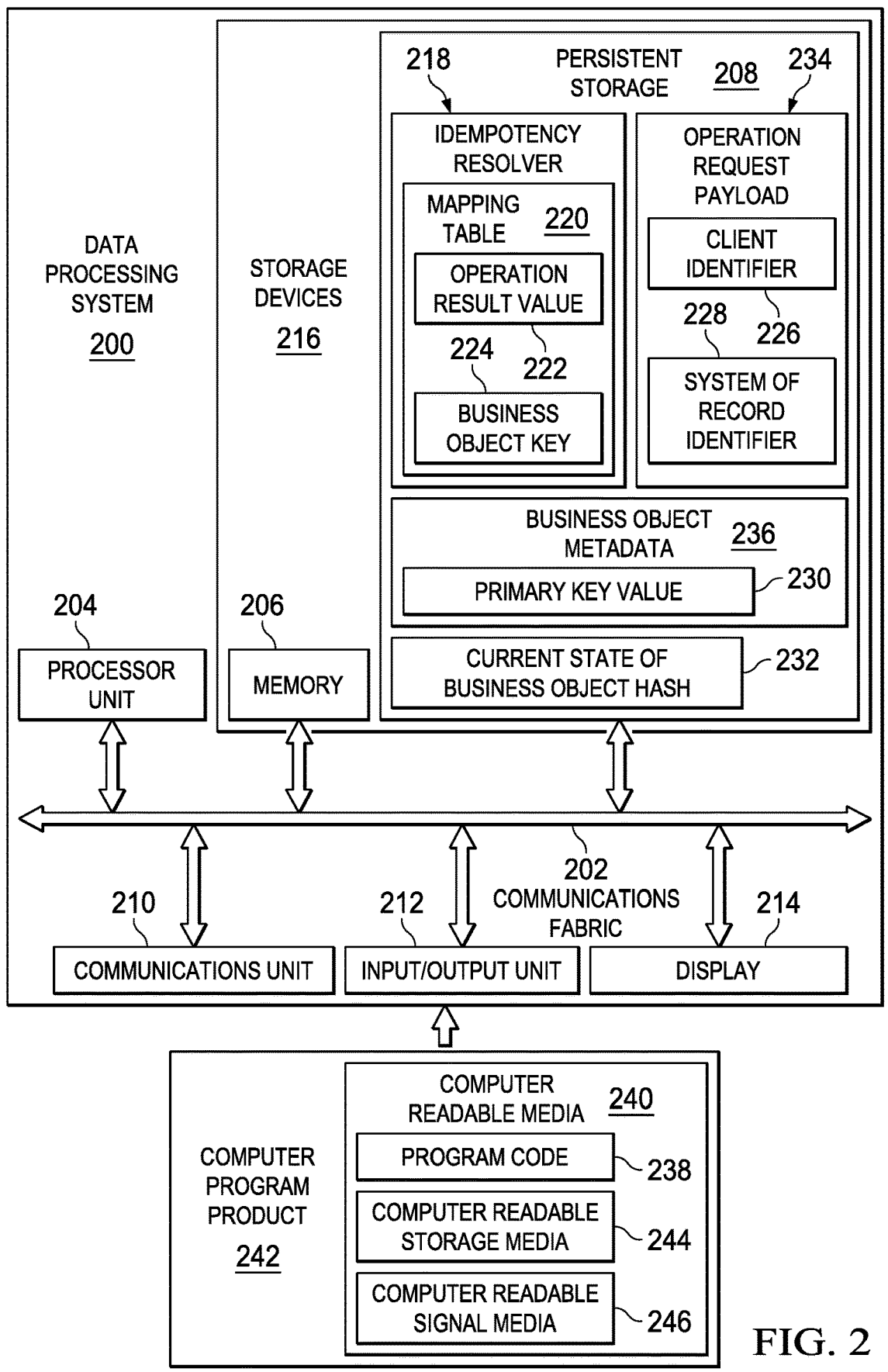
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores idempotency resolver 218. However, it should be noted that even though idempotency resolver 218 is illustrated as residing in persistent storage 208, in an alternative illustrative embodiment idempotency resolver 218 may be a separate component of data processing system 200. For example, idempotency resolver 218 may be a hardware component coupled to communication fabric 202 or a combination of hardware and software components.

Idempotency resolver 218 manages idempotent operations using mapping table 220 while interacting with a system of record, such as, for example, storage 108 in FIG. 1, to increase performance of the system of record by increasing response time and decreasing recovery time. Mapping table 220 represents a relational table that contains a mapping between client requests to perform operations on the system of record and results of idempotent operations (i.e., previously performed identical operations). In other words, mapping table 220 maintains records of idempotent operations performed on the system of record. Idempotency resolver 218 may key mapping table 220 by key/value pairs.

Whenever data processing system 200 receives a client request to perform the same operation on the system of record, idempotency resolver 218 retrieves the cached record of result, such as operation result value 222, which corresponds to that same operation, from mapping table 220 and sends the cached result to the requesting client. Thus, data processing system 200 does not forward client requests to the system of record for performance of idempotent operations, which improves response times.

Further, if the system of record needs to be restarted for some reason (e.g., system failure), then all in-transit client requests for operations on the system of record need to be re-run. This restart process may create a delay in system of record response times. For example, for each recovery client request, the request goes over the network, data corresponding to the request is fetched, and then recovery is performed. This recovery process may affect high availability service level agreements for the system of record application. Illustrative embodiments resolve this type of recovery scenario and improve the recovery time by providing the idempotency resolver service.

Operation result value 222 represents the stored value of the previously performed idempotent operation on the system of record. Idempotency resolver 218 keys operation result value 222 into mapping table 220 based on business object key 224. Idempotency resolver 218 generates business object key 224 based on client identifier 226, system of record identifier 228, primary key value 230, and current state of business object hash 232.

Client identifier 226 uniquely identifies the client that sent the request to perform the operation on the system of record. System of record identifier 228 uniquely identifies the system of record that the requested operation is to be performed on. Idempotency resolver 218 extracts client identifier 226 and system of record identifier 228 from operation request payload 234. Operation request payload 234 represents the content of the client request to perform the desired operation on the system of record. Primary key value 230 uniquely identifies the business object corresponding to the requested operation. A business object holds a set of variables, properties, or attributes and may include associations with other business objects. For example, "manager" may be a business object where its attributes may be "name", "location", "security clearance level", and the like, and may include associations with employees under the manager. Idempotency resolver 218 extracts primary key value 230 from business object metadata 226. Current state of business object hash 232 represents a hash of the current state of the business object within the system of record.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
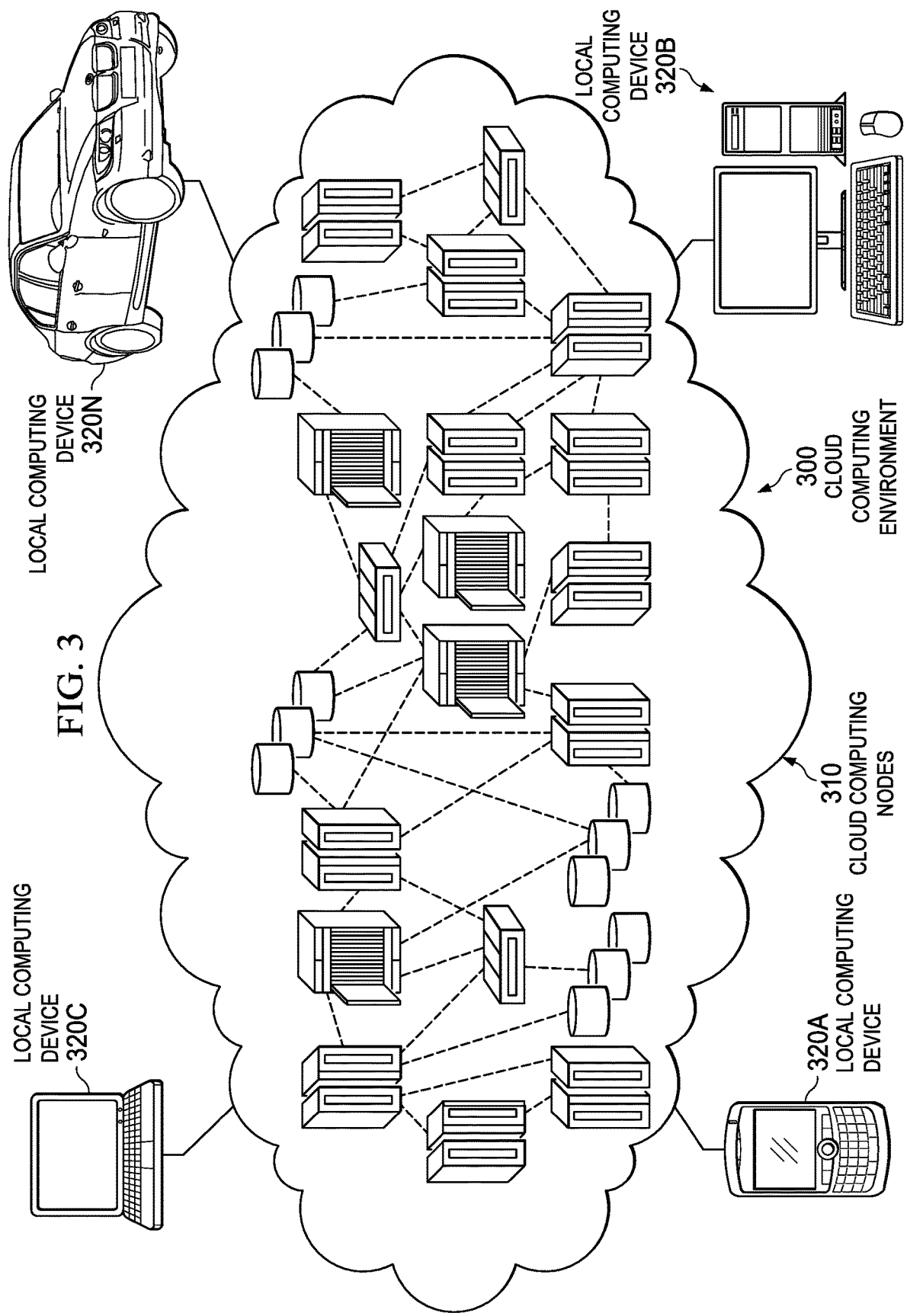
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
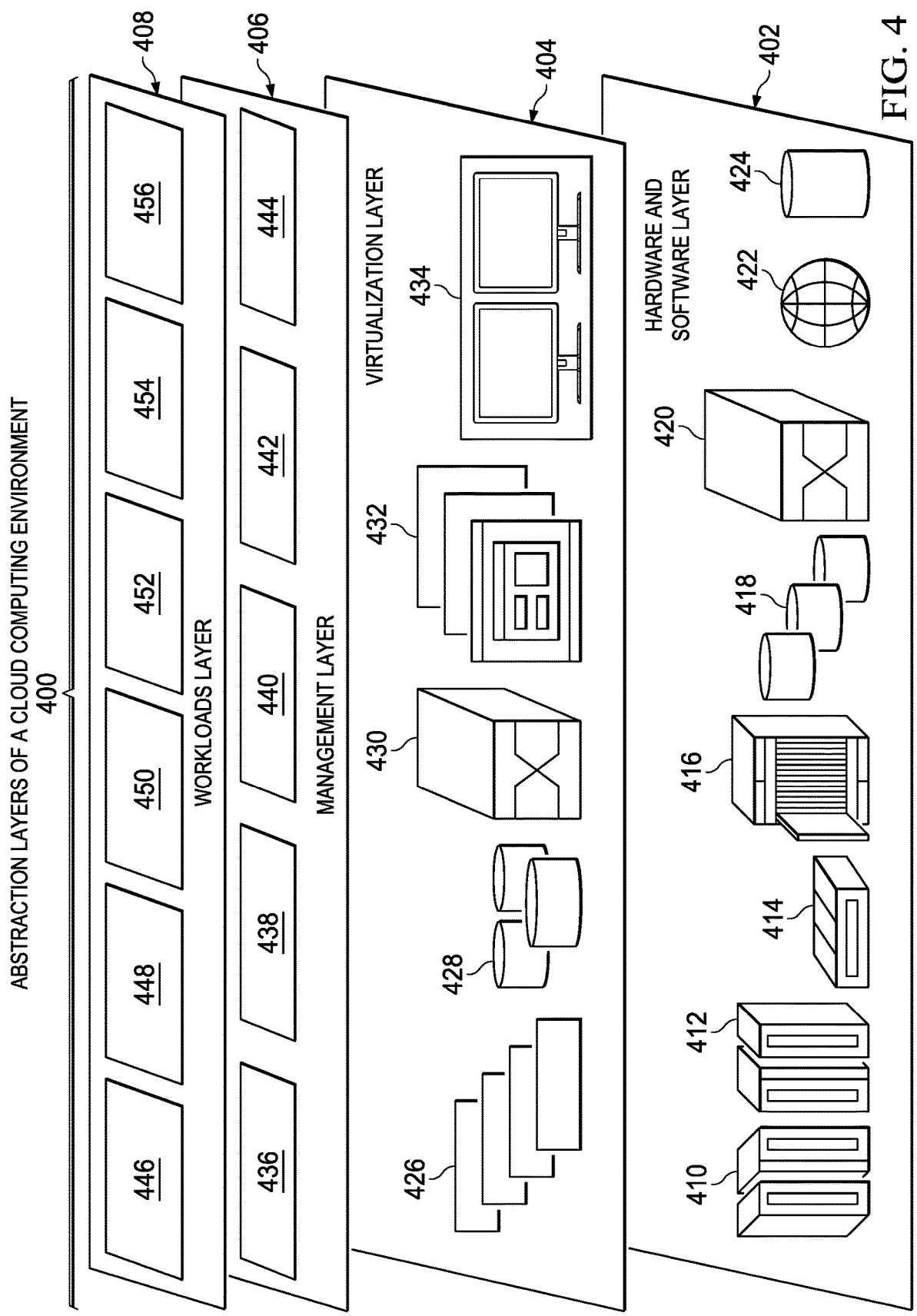
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and idempotent operations processing 456.

As information technology moves toward a RESTful paradigm, connector service operations should exhibit idempotency since Representational State Transfer (REST) is a stateless protocol and is important to successfully handling multiple requests to perform the same operation multiple times in a cloud environment. RESTful web services are one way of providing interoperability between computer systems on an internet. REST-compliant web services allow requesting computer systems to access and manipulate textual representations of web resources using a uniform and predefined set of stateless operations. From a RESTful service standpoint, for an operation request or service call to be idempotent, clients can make that same operation request repeatedly while producing the same result. In other words, making multiple identical operation requests has the same effect as making a single operation request. Thus, an idempotent operation is one that has no additional effect on the system of record if the idempotent operation is called more than once with the same input parameters.

A current challenge is when a large number of such identical requests, which occur during periods of heavy load or spikes, are processed by a connector service. This large number of identical requests piles up on the system of record causing the service of record's infrastructure to saturate, which may lead to degradation of enterprise system throughput. As a result, a need exists to efficiently handle idempotent operations inside a connector service to decrease the heavy load on the service of record's infrastructure and to increase connector service operations response time.

Illustrative embodiments provide a process for efficiently handling multiple requests for idempotent operations in a clustered connector service solution deployed in a cloud environment by utilizing an idempotency resolver. This idempotency resolver uniquely identifies a business object corresponding to each respective incoming operation request and processes identical operation requests without calling the system of record, thereby decreasing or eliminating an overload condition on the infrastructure of the system of record. As a result, illustrative embodiments may, for example, increase the throughput of the system of record and decrease operation request response times.

Illustrative embodiments query the idempotency resolver service to determine whether a requested operation on the system of record has already been executed. If the requested operation has already been executed, then illustrative embodiments get the operation result from the idempotency resolver service and return the operation result to the requesting client. If the requested operation has not been executed previously, then illustrative embodiments invoke the system of record, get the operation result from the system of record, and update the idempotency resolver service with the operation result from the system of record. In addition, illustrative embodiments may clean up a record entry in a mapping table of the idempotency resolver service in response to detecting that a stored operation result is dirty.

Figure 5:
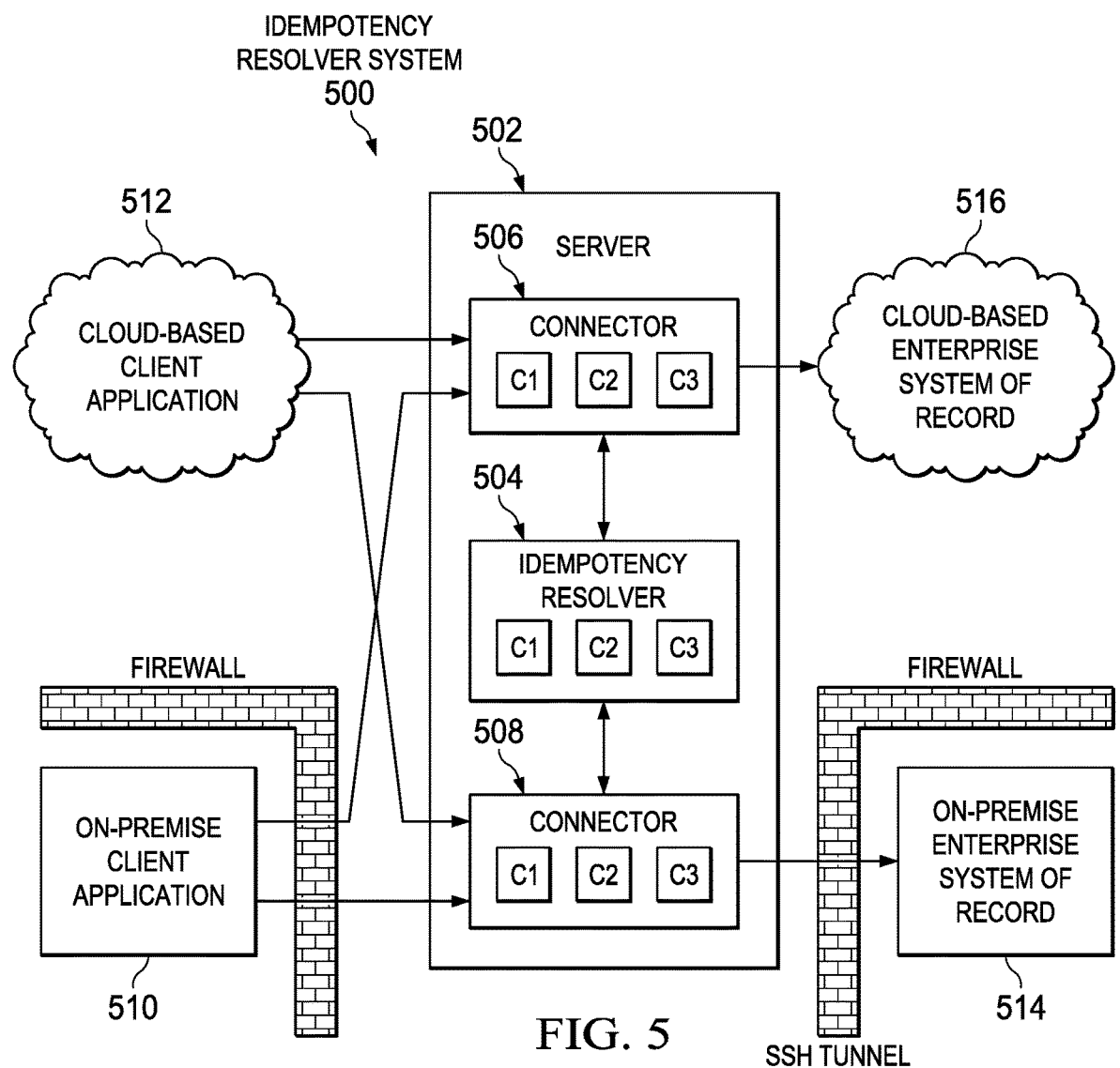
FIG. 5 is a diagram illustrating an example of a idempotency resolver system in accordance with an illustrative embodiment.

With reference now to FIG. 5, a diagram illustrating an example of a idempotency resolver system is depicted in accordance with an illustrative embodiment. Idempotency resolver system 500 may be implemented in a network of data processing systems, such as network data processing system 100 in FIG. 1, or a cloud computing environment, such as cloud computing environment 300 in FIG. 3. Idempotency resolver system 500 is a system of hardware and software components for managing idempotent operations by an idempotency resolver interacting with a system of record.

In this example, idempotency resolver system 500 includes server 502. Server 502 may be, for example, server 104 in FIG. 1, data processing system 200 in FIG. 2, or a cloud computing node in cloud computing nodes 310 in FIG. 3. Server 502 includes idempotency resolver 504, such as idempotency resolver 218 in FIG. 2, to manage and resolve idempotent operations. Server 502 also includes connector 506 and connector 508. Connector 506 and connector 508 provide connector services between clients, such as on-premise client application 510 and cloud-based client application 512, and system of records, such as on-premise enterprise system of record 514 and cloud-based enterprise system of record 516. Idempotency resolver 504 connects to connector 506 and connector 508 to manage idempotent operations requested to be performed on on-premise enterprise system of record 514 and cloud-based enterprise system of record 516 by on-premise client application 510 and cloud-based client application 512. In addition, enterprise connectors corresponding to on-premise enterprise system of record 514 and cloud-based enterprise system of record 516 also may monitor for other changes occurring on their respective system of records (e.g., changes not made by idempotency resolver system 500) so that if there is any change in state of the system of records, then the enterprise connects will notify idempotency resolver 504 to update the mapping table, such as mapping table 220 in FIG. 2, accordingly.

Figure 6:
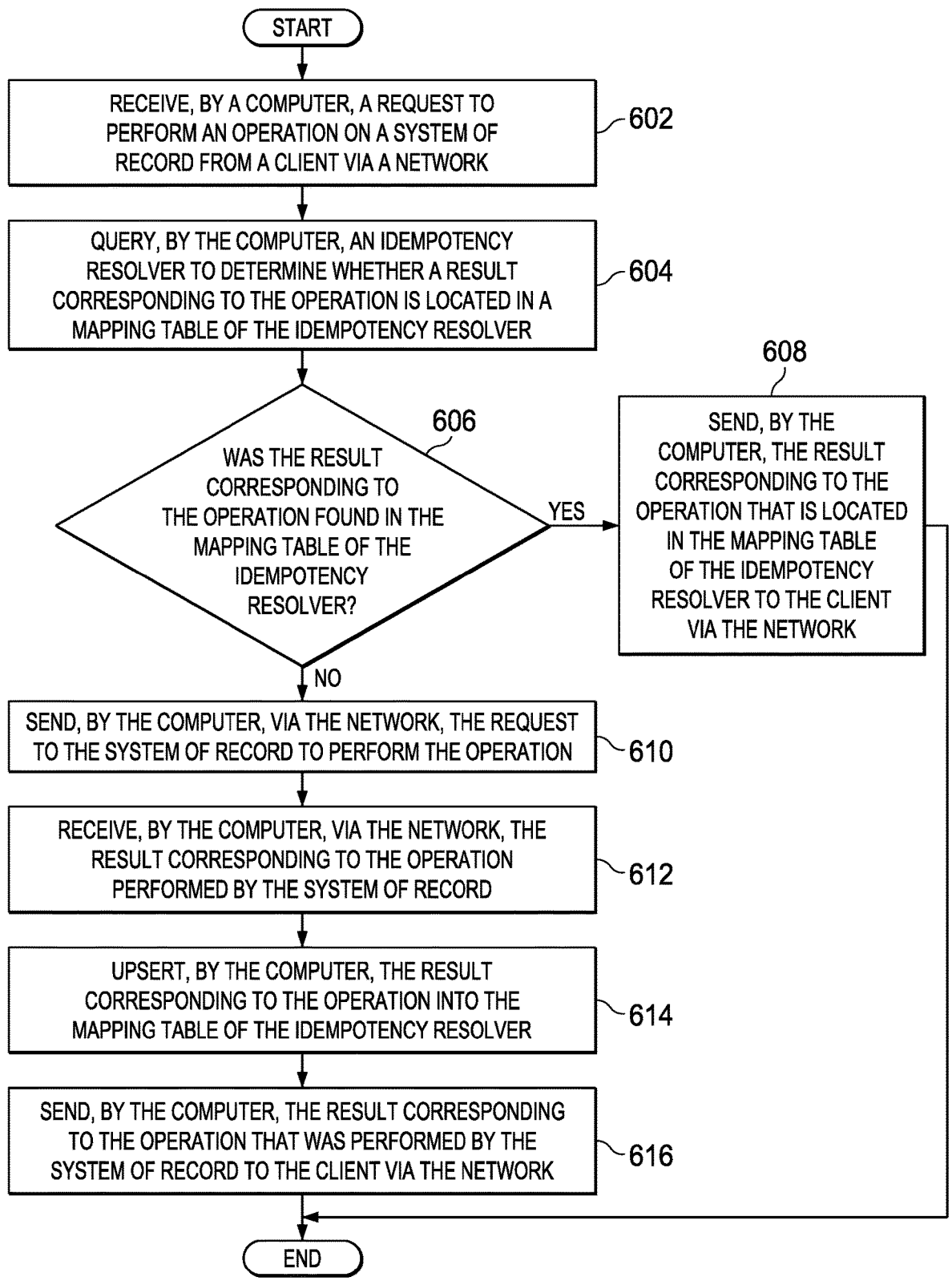
FIG. 6 is a flowchart illustrating an overall process for managing an idempotent operation in accordance with an illustrative embodiment.

With reference now to FIG. 6, a flowchart illustrating a process for an overall process for managing an idempotent operation is shown in accordance with an illustrative embodiment. The process shown in FIG. 6 may be implemented in a computer, such as, for example, server 104 FIG. 1 and data processing system 200 in FIG. 2.

The process begins when the computer receives a request to perform an operation on a system of record from a client via a network (step 602). The system of record may be, for example, storage 108 in FIG. 1 or on-premise enterprise system of record 514 or cloud-based enterprise system of record 516 in FIG. 5. The client may be, for example, client 110 in FIG. 1, local computing device 320A in FIG. 3, or on-premise client application 510 or cloud-based client application 512 in FIG. 5. The network may be, for example, network 102 in FIG. 1.

After receiving the request to perform the operation in step 602, the computer queries an idempotency resolver to determine whether a result corresponding to the operation is located in a mapping table of the idempotency resolver (step 604). The idempotency resolver may be, for example, idempotency resolver 218 in FIG. 2 or idempotency resolver 504 in FIG. 5. The result corresponding to the operation may be, for example, operation result value 222 in FIG. 2. The mapping table of the idempotency resolver may be, for example, mapping table 220 in FIG. 2.

Subsequently, the computer makes a determination as to whether the result corresponding to the operation was found in the mapping table of the idempotency resolver (step 606). If the computer determines that the result corresponding to the operation is in the mapping table of the idempotency resolver, yes output of step 606, then the computer sends the result corresponding to the operation, which is located in the mapping table of the idempotency resolver, to the client via the network (step 608). If the computer determines that no result corresponding to the operation exists in the mapping table of the idempotency resolver, no output of step 606, then the computer sends, via the network, the request to the system of record to perform the operation (step 610).

Afterward, the computer receives, via the network, the result corresponding to the operation performed by the system of record (step 612). In addition, the computer upserts the result corresponding to the operation into the mapping table of the idempotency resolver (step 614). An upsert operation inserts an entry into a relational database table if the entry does not already exist in the table or updates the entry if the entry already exists in the table. Further, the computer sends the result corresponding to the operation, which was performed by the system of record, to the client via the network (step 616). Thereafter, the process terminates.

Figure 7:
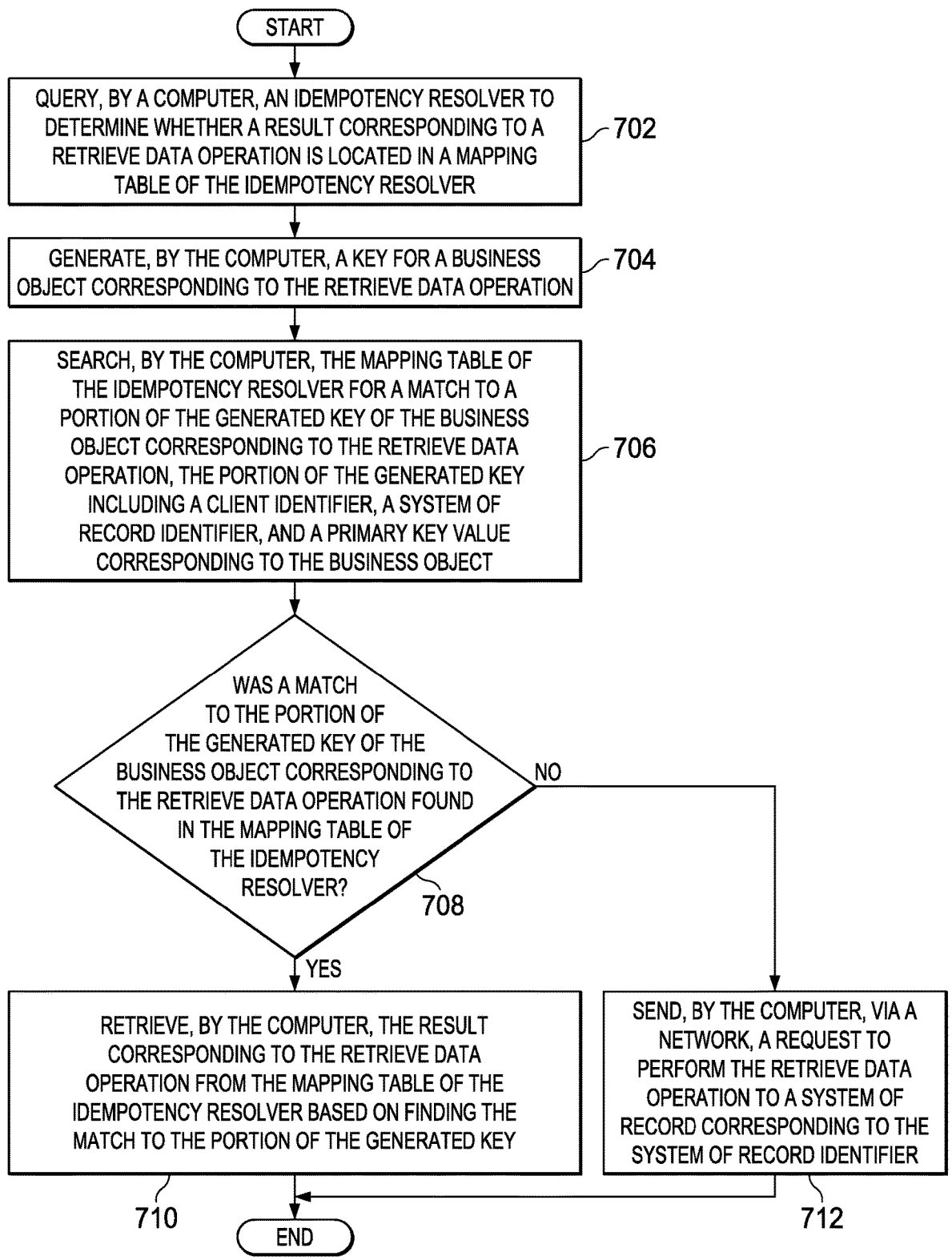
FIG. 7 is a flowchart illustrating a process for managing a retrieve data operation in accordance with an illustrative embodiment.

With reference now to FIG. 7, a flowchart illustrating a process for managing a retrieve data operation is shown in accordance with an illustrative embodiment. The process shown in FIG. 7 may be implemented in a computer, such as, for example, server 104 FIG. 1 and data processing system 200 in FIG. 2.

The process begins when the computer queries an idempotency resolver to determine whether a result corresponding to a retrieve data operation is located in a mapping table of the idempotency resolver (step 702). The result corresponding to the retrieve data operation may be, for example, operation result value 222 in FIG. 2. The retrieve data operation may be, for example, a GET method of Hypertext Transfer Protocol. Hypertext Transfer Protocol (HTTP) defines different methods to indicate desired action to be performed on an identified resource. The idempotency resolver may be, for example, idempotency resolver 218 in FIG. 2 or idempotency resolver 504 in FIG. 5. The mapping table of the idempotency resolver may be, for example, mapping table 220 in FIG. 2.

In addition, the computer generates a key for a business object corresponding to the retrieve data operation (step 704). The key for the business object may be, for example, business object key 224 in FIG. 2. Further, the computer searches the mapping table of the idempotency resolver for a match to a portion of the generated key of the business object corresponding to the retrieve data operation (step 706). The portion of the generated key includes a client identifier, a system of record identifier, and a primary key value corresponding to the business object. The primary key value corresponding to the business object may be, for example, primary key value 228 in FIG. 2.

The computer makes a determination as to whether a match to the portion of the generated key of the business object corresponding to the retrieve data operation was found in the mapping table of the idempotency resolver (step 708). If the computer determines that a match to the portion of the generated key of the business object corresponding to the retrieve data operation is in the mapping table of the idempotency resolver, yes output of step 708, then the computer retrieves the result corresponding to the retrieve data operation from the mapping table of the idempotency resolver based on finding the match to the portion of the generated key (step 710). If the computer determines that no match to the portion of the generated key of the business object corresponding to the retrieve data operation exists in the mapping table of the idempotency resolver, no output of step 708, then the computer sends, via a network, a request to perform the retrieve data operation to a system of record corresponding to the system of record identifier (step 712). The network may be, for example, network 102 in FIG. 1. The system of record may be, for example, storage 108 in FIG. 1 or on-premise enterprise system of record 514 or cloud-based enterprise system of record 516 in FIG. 5. Thereafter, the process terminates.

Figure 8:
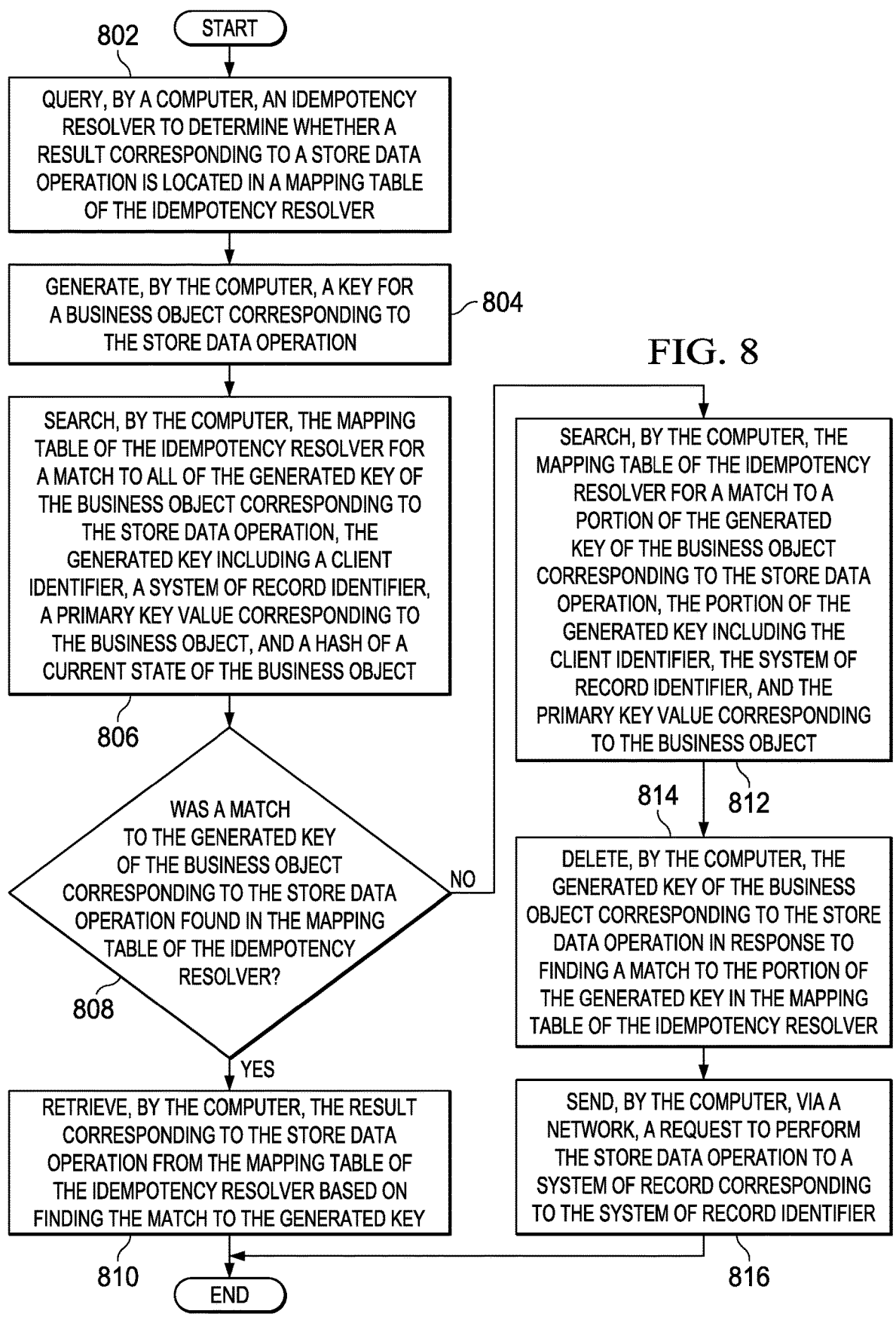
FIG. 8 is a flowchart illustrating a process for managing a store data operation in accordance with an illustrative embodiment.

With reference now to FIG. 8, a flowchart illustrating a process for managing a store data operation is shown in accordance with an illustrative embodiment. The process shown in FIG. 8 may be implemented in a computer, such as, for example, server 104 FIG. 1 and data processing system 200 in FIG. 2.

The process begins when the computer queries an idempotency resolver to determine whether a result corresponding to a store data operation is located in a mapping table of the idempotency resolver (step 802). The result corresponding to the store data operation may be, for example, operation result value 222 in FIG. 2. The store data operation may be, for example, a PUT method of HTTP. The idempotency resolver may be, for example, idempotency resolver 218 in FIG. 2 or idempotency resolver 504 in FIG. 5. The mapping table of the idempotency resolver may be, for example, mapping table 220 in FIG. 2.

Further, the computer generates a key for a business object corresponding to the store data operation (step 804). The key for the business object may be, for example, business object key 224 in FIG. 2. Furthermore, the computer searches the mapping table of the idempotency resolver for a match to all of the generated key of the business object corresponding to the store data operation (step 806). The entire generated key includes a client identifier, a system of record identifier, a primary key value corresponding to the business object, and a hash of a current state of the business object. The primary key value corresponding to the business object and the hash of the current state of the business object may be, for example, primary key value 228 and current state of business object hash 236 in FIG. 2.

The computer makes a determination as to whether a match to the generated key of the business object corresponding to the store data operation was found in the mapping table of the idempotency resolver (step 808). If the computer determines that a match to the generated key of the business object corresponding to the store data operation is in the mapping table of the idempotency resolver, yes output of step 808, then the computer retrieves the result corresponding to the store data operation from the mapping table of the idempotency resolver based on finding the match to the generated key (step 810). If the computer determines that no match to the generated key of the business object corresponding to the store data operation exists in the mapping table of the idempotency resolver, no output of step 808, then the computer searches the mapping table of the idempotency resolver for a match to a portion of the generated key of the business object corresponding to the store data operation (step 812). The portion of the generated key includes the client identifier, the system of record identifier, and the primary key value corresponding to the business object.

In addition, the computer deletes the generated key of the business object corresponding to the store data operation in response to finding a match to the portion of the generated key in the mapping table of the idempotency resolver (step 814). The computer also sends, via a network, a request to perform the store data operation to a system of record corresponding to the system of record identifier (step 816). The network may be, for example, network 102 in FIG. 1. The system of record may be, for example, storage 108 in FIG. 1 or on-premise enterprise system of record 514 or cloud-based enterprise system of record 516 in FIG. 5. Thereafter, the process terminates.

Figure 9:
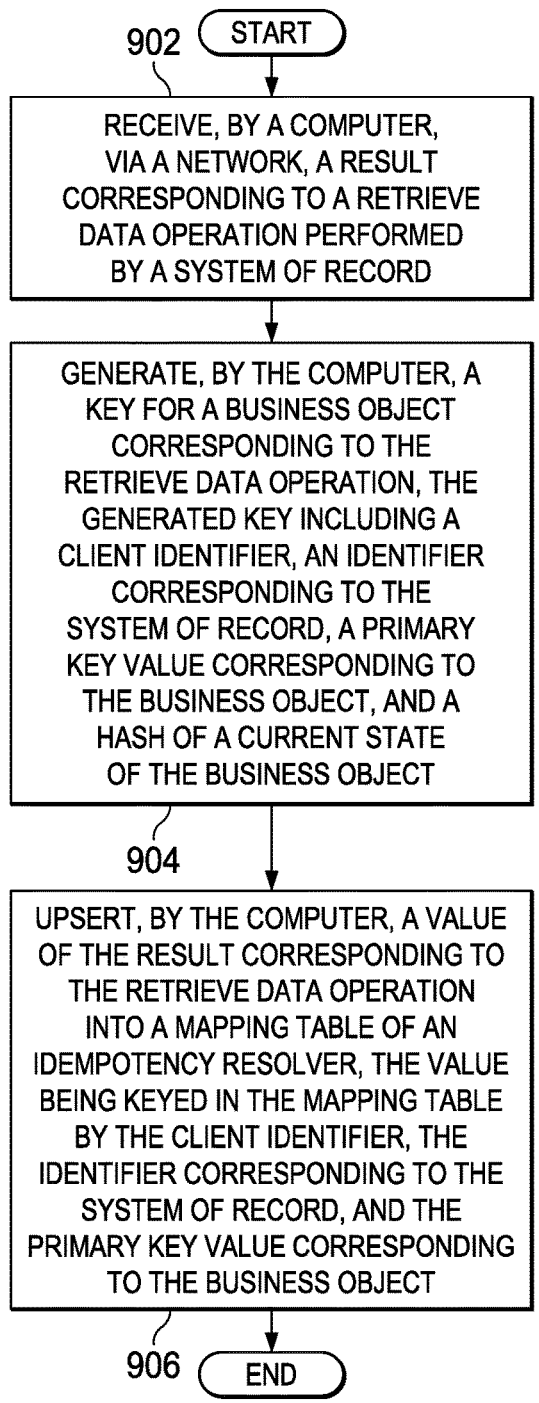
FIG. 9 is a flowchart illustrating a process for upserting a value corresponding to a retrieve data operation into a mapping table in accordance with an illustrative embodiment.

With reference now to FIG. 9, a flowchart illustrating a process for upserting a value corresponding to a retrieve data operation into a mapping table is shown in accordance with an illustrative embodiment. The process shown in FIG. 9 may be implemented in a computer, such as, for example, server 104 FIG. 1 and data processing system 200 in FIG. 2.

The process begins when the computer receives, via a network, a result corresponding to a retrieve data operation performed by a system of record (step 902). The network may be, for example, network 102 in FIG. 1. The system of record may be, for example, storage 108 in FIG. 1 or on-premise enterprise system of record 514 or cloud-based enterprise system of record 516 in FIG. 5.

In addition, the computer generates a key for a business object corresponding to the retrieve data operation (step 904). The key for the business object may be, for example, business object key 224 in FIG. 2. The generated key includes a client identifier, an identifier corresponding to the system of record, a primary key value corresponding to the business object, and a hash of a current state of the business object. The primary key value corresponding to the business object and the hash of the current state of the business object may be, for example, primary key value 228 and current state of business object hash 236 in FIG. 2. Moreover, the computer upserts a value of the result corresponding to the retrieve data operation into a mapping table of an idempotency resolver (step 906). The value of the result corresponding to the retrieve data operation may be, for example, operation result value 222 in FIG. 2. The computer keys the value in the mapping table based on the client identifier, the identifier corresponding to the system of record, and the primary key value corresponding to the business object. Thereafter, the process terminates.

Figure 10:
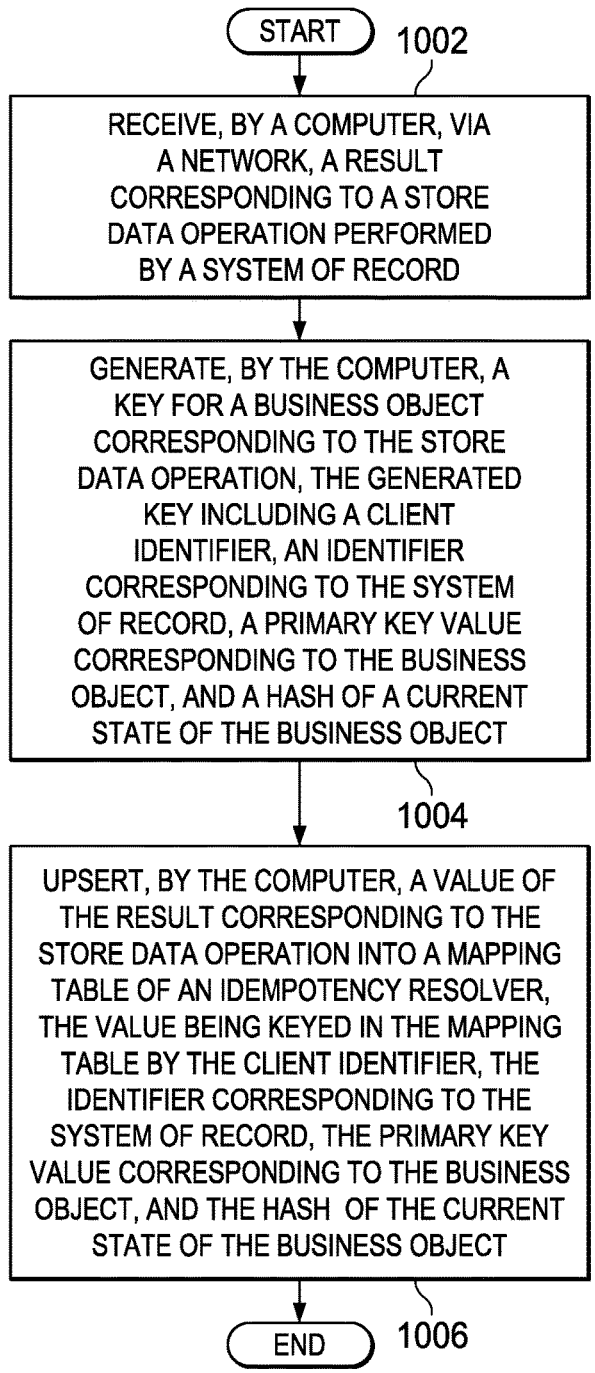
FIG. 10 is a flowchart illustrating a process for upserting a value corresponding to a store data operation into a mapping table in accordance with an illustrative embodiment.

With reference now to FIG. 10, a flowchart illustrating a process for upserting a value corresponding to a store data operation into a mapping table is shown in accordance with an illustrative embodiment. The process shown in FIG. 10 may be implemented in a computer, such as, for example, server 104 FIG. 1 and data processing system 200 in FIG. 2.

The process begins when the computer receives, via a network, a result corresponding to a store data operation performed by a system of record (step 1002). The network may be, for example, network 102 in FIG. 1. The system of record may be, for example, storage 108 in FIG. 1 or on-premise enterprise system of record 514 or cloud-based enterprise system of record 516 in FIG. 5.

Further, the computer generates a key for a business object corresponding to the store data operation (step 1004). The key for the business object may be, for example, business object key 224 in FIG. 2. The generated key includes a client identifier, an identifier corresponding to the system of record, a primary key value corresponding to the business object, and a hash of a current state of the business object. The primary key value corresponding to the business object and the hash of the current state of the business object may be, for example, primary key value 228 and current state of business object hash 236 in FIG. 2. Furthermore, the computer upserts a value of the result corresponding to the store data operation into a mapping table of an idempotency resolver (step 1006). The value of the result corresponding to the store data operation may be, for example, operation result value 222 in FIG. 2. The computer keys the value in the mapping table based on the client identifier, the identifier corresponding to the system of record, the primary key value corresponding to the business object, and the hash of the current state of the business object. Thereafter, the process terminates.

Figure 11:
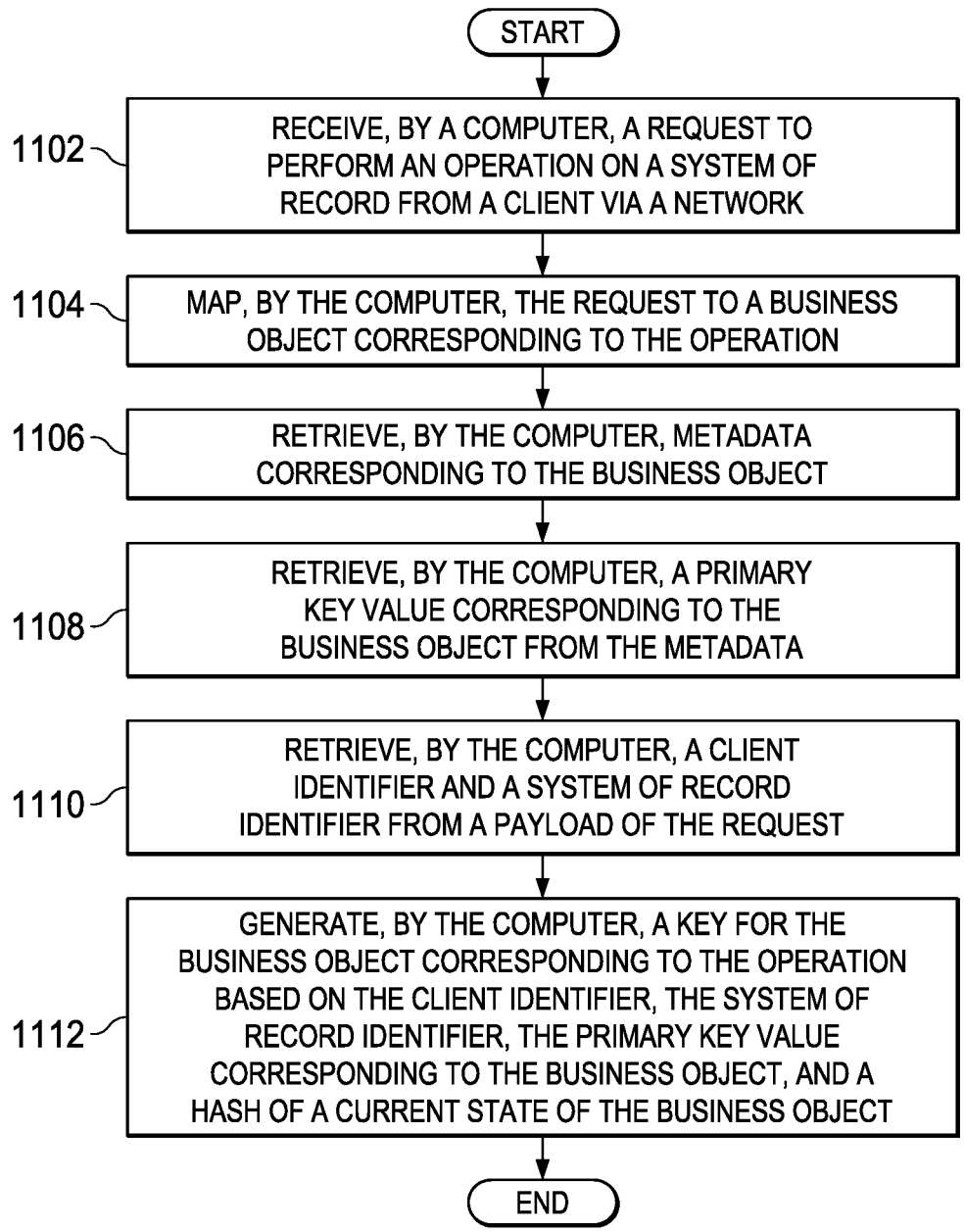
FIG. 11 is a flowchart illustrating a process for generating a key for a business object corresponding to an operation in accordance with an illustrative embodiment.

With reference now to FIG. 11, a flowchart illustrating a process for generating a key for a business object corresponding to an operation is shown in accordance with an illustrative embodiment. The process shown in FIG. 1 may be implemented in a computer, such as, for example, server 104 FIG. 1 and data processing system 200 in FIG. 2.

The process begins when the computer receives a request to perform an operation on a system of record from a client via a network (step 1102). The system of record may be, for example, storage 108 in FIG. 1 or on-premise enterprise system of record 514 or cloud-based enterprise system of record 516 in FIG. 5. The client may be, for example, client 110 in FIG. 1, local computing device 320A in FIG. 3, or on-premise client application 510 or cloud-based client application 512 in FIG. 5. The network may be, for example, network 102 in FIG. 1.

After receiving the request to perform the operation on the system of record in step 1102, the computer maps the request to a business object corresponding to the operation (step 1104). The computer also retrieves metadata corresponding to the business object, such as business object metadata 226 in FIG. 2 (step 1106). In addition, the computer retrieves a primary key value corresponding to the business object, such as primary key value 228 in FIG. 2, from the metadata (step 1108).

Further, the computer retrieves a client identifier and a system of record identifier from a payload of the request (step 1110). Furthermore, the computer generates a key for the business object corresponding to the operation based on the client identifier, the system of record identifier, the primary key value corresponding to the business object, and a hash of a current state of the business object (step 1112). The hash of the current state of the business object may be, for example, current state of business object hash 236 in FIG. 2. Thereafter, the process terminates.

Thus, illustrative embodiments of the present invention provide a computer-implemented method, computer system, and computer program product for managing idempotent operations by an idempotency resolver service using a mapping table while interacting with a system of record to increase response time and decrease recovery time. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   managing idempotent operations on a computer, by the computer:
   receiving a first request to perform an operation on a system of record from a client, wherein the first request is received via a network;
   querying an idempotency resolver to determine whether a result corresponding to the operation is located in a mapping table of the idempotency resolver;
   generating a generated key for a business object corresponding to the operation;
   searching the mapping table for a first match to all of the generated key;
   responsive to determining that the first match exists, retrieving the result from the mapping table based on finding the first match;
   responsive to determining that the first match does not exist, searching the mapping table for a second match to a portion of the generated key of the business object; and
   responsive to determining that the result is in the mapping table, sending the result to the client via the network; and
   wherein:
   the first match to the generated key is for all of the generated key of the business object;
   all of the generated key includes a client identifier, a system of record identifier, a primary key value corresponding to the business object, and a hash of a current state of the business object;
   responsive to determining that the first match to the generated key is in the mapping table, retrieving the result corresponding to the operation from the mapping table is based on finding the first match to all of the generated key; or
   responsive to determining that the first match to the generated key does not exist in the mapping table, the portion of the generated key includes the client identifier, the system of record identifier, and the primary key value corresponding to the business object.

2. The method of claim 1 further comprising the computer:
   responsive to determining that the result corresponding to the operation does not exist in the mapping table, sending, via the network, the first request to the system of record to perform the operation;
   receiving, via the network, the result corresponding to the operation performed by the system of record;
   upserting the result corresponding to the operation performed by the system of record into the mapping table; and
   sending, via the network, the result corresponding to the operation that was performed by the system of record to the client via the network.

3. The method of claim 1, wherein:
   the operation comprises a retrieve data operation; and
   the portion of the generated key includes the client identifier, the system of record identifier, and the primary key value corresponding to the business object.

4. The method of claim 3 further comprising the computer:
   responsive to the computer determining that the first match does not exist, sending, via the network, a second request to perform the retrieve data operation to the system of record corresponding to the system of record identifier.

5. The method of claim 1, wherein:
   the operation comprises a store data operation.

6. The method of claim 5, further comprising:
   sending, via the network, a second request to perform the store data operation to the system of record corresponding to the system of record identifier.

7. The method of claim 1 further comprising the computer:
   receiving, via the network, the result, wherein the operation comprises a retrieve data operation performed by the system of record;
   generating a generated key for a business object corresponding to the retrieve data operation, wherein the generated key includes a client identifier, an identifier corresponding to the system of record, a primary key value corresponding to the business object, and a hash of a current state of the business object; and
   upserting a value of the result into the mapping table, wherein the value is keyed in the mapping table based on the client identifier, the identifier corresponding to the system of record, and the primary key value corresponding to the business object.

8. The method of claim 1 further comprising the computer:
   receiving, via the network, the result, wherein the operation comprises a store data operation performed by the system of record;
   generating a generated key for a business object corresponding to the store data operation, wherein the generated key includes a client identifier, an identifier corresponding to the system of record, a primary key value corresponding to the business object, and a hash of a current state of the business object; and
   upserting a value of the result into the mapping table, wherein the value is keyed in the mapping table based on the client identifier, the identifier corresponding to the system of record, the primary key value corresponding to the business object, and the hash of the current state of the business object.

9. The method of claim 1 further comprising the computer:
mapping the first request to a business object corresponding to the operation;
retrieving metadata corresponding to the business object;
retrieving a primary key value corresponding to the business object from the metadata;
retrieving a client identifier and a system of record identifier from a payload of the first request; and
generating a key for the business object corresponding to the operation based on the client identifier, the system of record identifier, the primary key value corresponding to the business object, and a hash of a current state of the business object.

10. The method of claim 1, wherein the mapping table contains a mapping between a plurality of requests and previous results of corresponding idempotent operations.

11. A computer system comprising:
a storage device connected to a bus system, wherein the storage device stores program instructions for managing idempotent operations; and
a processor connected to the bus system, wherein the processor executes the program instructions to:
receive a request to perform an operation on a system of record from a client via a network;
query an idempotency resolver to determine whether a result corresponding to the operation is located in a mapping table of the idempotency resolver;
generate a generated key for a business object corresponding to the operation, wherein a portion of the generated key includes a client identifier, a system of record identifier, and a primary key value corresponding to the business object;
searching the mapping table for a first match to all of the generated key;
send the result to the client via the network in response to determining that the result is in the mapping table; and
send a second request via the network to perform the operation to the system of record corresponding to the system of record identifier.

12. The computer system of claim 11, wherein the processor further executes the program instructions to:
send, via the network, the request to the system of record to perform the operation responsive to determining that the result does not exist in the mapping table;
receive, via the network, the result corresponding to the operation performed by the system of record;
upsert the result corresponding to the operation performed by the system of record into the mapping table; and
send the result corresponding to the operation performed by the system of record to the client via the network.

13. A computer program product comprising:
a computer-readable storage medium having program instructions for managing idempotent operations embodied therewith, wherein execution of the program instructions by a computer causes the computer to:
receive from a client, via a network, a first request to perform an operation on a system of record;
query an idempotency resolver to determine whether a result corresponding to the operation is located in a mapping table of the idempotency resolver;
generate a generated key for a business object corresponding to the operation;
searching the mapping table for a first match to the generated key of the business object;
responsive to determining that the first match is in the mapping table, retrieve the result from the mapping table based on finding the first match to the generated key;
responsive to determining that the first match does not exist in the mapping table, search the mapping table for a second match to a portion of the generated key of the business object;
responsive to determining that the result is in the mapping table, send, via the network, the result to the client; and
send, via the network, a second request to perform the operation to the system of record corresponding to a system of record identifier.

14. The computer program product of claim 13, wherein the execution of the program instructions further causes the computer to:
responsive to determining that the result corresponding to the operation does not exist in the mapping table, send, via the network, the first request to the system of record to perform the operation;
receive, via the network, the result corresponding to the operation performed by the system of record;
upsert the result corresponding to the operation performed by the system of record into the mapping table; and
send, via the network, the result corresponding to the operation that was performed by the system of record to the client.

15. The computer program product of claim 13, wherein the execution of the program instructions further causes the computer to:
generate a generated key for a business object corresponding to the operation, wherein the operation comprises a retrieve data operation; and
search the mapping table for a match to a portion of the generated key of the business object corresponding to the retrieve data operation, wherein the portion of the generated key includes a client identifier, a system of record identifier, and a primary key value corresponding to the business object.

16. The computer program product of claim 15, wherein the execution of the program instructions further causes the computer to:
responsive to determining that the match is in the mapping table, retrieve the result corresponding to the retrieve data operation from the mapping table based on finding the match to the portion of the generated key; or
responsive to determining that the match does not exist in the mapping table, send, via the network, a second request to perform the retrieve data operation to the system of record corresponding to the system of record identifier.

17. The computer program product of claim 13, wherein:
the operation comprises a store data operation;
the first match to the generated key of the business object is for all of the generated key of the business object; and
all of the generated key includes a client identifier, the system of record identifier, a primary key value corresponding to the business object, and a hash of a current state of the business object.

18. The computer program product of claim 17, wherein:
responsive to determining that the first match to the generated key of the business object is in the mapping table, retrieving the result corresponding to the store data operation from the mapping table is based on finding the first match to all of the generated key; or responsive to determining that the first match to the generated key of the business object does not exist in the mapping table, the portion of the generated key includes the client identifier, the system of record identifier, and the primary key value corresponding to the business object, and sending, by the computer via the network, a second request to perform the store data operation to the system of record corresponding to the system of record identifier.

19. The computer program product of claim 13, wherein the execution of the program instructions further causes the computer to:

receive, via the network, the result, wherein the operation comprises a retrieve data operation performed by the system of record;

generate a generated key for a business object corresponding to the retrieve data operation, wherein the generated key includes a client identifier, an identifier corresponding to the system of record, a primary key value corresponding to the business object, and a hash of a current state of the business object; and upsert a value of the result corresponding to the retrieve data operation into the mapping table, wherein the value is keyed in the mapping table based on the client identifier, the identifier corresponding to the system of record, and the primary key value corresponding to the business object.

20. The computer program product of claim 13, wherein the execution of the program instructions further causes the computer to:

receive, via the network, the result, wherein the operation comprises a store data operation performed by the system of record;

generate a generated key for a business object corresponding to the store data operation, wherein the generated key includes a client identifier, an identifier corresponding to the system of record, a primary key value corresponding to the business object, and a hash of a current state of the business object; and upsert a value of the result corresponding to the store data operation into the mapping table, wherein the value is keyed in the mapping table based on the client identifier, the identifier corresponding to the system of record, the primary key value corresponding to the business object, and the hash of the current state of the business object.

* * * * *